(12) United States Patent
Polaganga

(10) Patent No.: US 12,389,442 B2
(45) Date of Patent: Aug. 12, 2025

(54) SYSTEMS AND METHODS FOR CONTROLLING BEAM PARAMETERS TO IMPROVE SIGNAL STRENGTH

(71) Applicant: T-MOBILE INNOVATIONS LLC, Overland Park, KS (US)

(72) Inventor: Roopesh Kumar Polaganga, Bothell, WA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 0 days.

(21) Appl. No.: 18/513,201

(22) Filed: Nov. 17, 2023

(65) Prior Publication Data
US 2024/0090013 A1 Mar. 14, 2024

Related U.S. Application Data

(63) Continuation of application No. 18/060,897, filed on Dec. 1, 2022, now Pat. No. 11,864,220, which is a continuation of application No. 17/527,614, filed on Nov. 16, 2021, now Pat. No. 11,546,919.

(51) Int. Cl.
| | | |
|---|---|---|
| *H04L 1/02* | (2006.01) | |
| *H04B 7/0452* | (2017.01) | |
| *H04B 17/318* | (2015.01) | |
| *H04W 72/542* | (2023.01) | |

(52) U.S. Cl.
CPC ........ *H04W 72/542* (2023.01); *H04B 7/0452* (2013.01); *H04B 17/318* (2015.01)

(58) Field of Classification Search
CPC ....... H04L 1/0618; H04L 1/06; H04L 12/189; H04L 5/0048; H04B 7/0452; H04B 7/088; H04B 17/318; H04W 72/542; H04W 36/16; H04W 36/08; H04W 36/0088
USPC ......................................... 375/267, 260, 162
See application file for complete search history.

(56) References Cited

U.S. PATENT DOCUMENTS

| | | | |
|---|---|---|---|
| 9,913,096 | B1 | 3/2018 | Chen et al. |
| 10,790,897 | B1 * | 9/2020 | Yang ..................... H04W 24/10 |
| 2004/0203425 | A1 * | 10/2004 | Coffin, III ............. H04W 52/42 455/12.1 |
| 2010/0165914 | A1 | 7/2010 | Cho et al. |
| 2018/0084473 | A1 * | 3/2018 | Nagaraja ........... H04W 36/0077 |

(Continued)

*Primary Examiner* — Khai Tran
(74) *Attorney, Agent, or Firm* — Shook, Hardy & Bacon L.L.P.

(57) ABSTRACT

Systems and methods are provided to address issues related to poor radio conditions (e.g., SS-RSRP/SS-RSRQ/SS-SINR) associated with poor coverage for user devices (e.g., user equipment (UEs)) positioned between Synchronization Signal Block (SSB) beams emitted from a cell tower. Specifically, Next Generation Node B (gNB) may identify the location of the user devices (reporting poor signal strength due to poor radio conditions) based on angle or arrival and/or timing advance. Systems and methods further include controlling a phase and amplitude of the SSB beam(s) serving the user device to improve the signal strength of these user devices experiencing poor radio conditions, until the signal strength is within/above target threshold value(s). In this manner, user coverage is improved, with the option to prioritize premium subscribers, without the need for employing a more expensive alternative (e.g., building additional cell sites and towers) for improving user coverage.

20 Claims, 8 Drawing Sheets

(56) References Cited

U.S. PATENT DOCUMENTS

| | | |
|---|---|---|
| 2019/0222384 A1 | 7/2019 | Wu et al. |
| 2019/0313308 A1 | 10/2019 | Li et al. |
| 2020/0100064 A1 | 3/2020 | O'Connor et al. |
| 2020/0228958 A1 | 7/2020 | Uddin et al. |
| 2021/0326726 A1 | 10/2021 | Wang et al. |
| 2022/0164997 A1 | 5/2022 | Mantri et al. |
| 2022/0255600 A1* | 8/2022 | Raghavan ............ H04L 5/0048 |
| 2024/0235622 A1* | 7/2024 | Sahraei ................ H04B 7/1555 |

* cited by examiner

SYSTEMS AND METHODS FOR CONTROLLING BEAM PARAMETERS TO IMPROVE SIGNAL STRENGTH

CROSS-REFERENCE TO RELATED APPLICATION

This application is a continuation of U.S. application Ser. No. 18/060,897, filed Dec. 1, 2022, which is a continuation of U.S. application Ser. No. 17/527,614, filed Nov. 16, 2021, now U.S. Pat. No. 11,546,919 and entitled "SYSTEMS AND METHODS FOR CONTROLLING BEAM PARAMETERS TO IMPROVE SIGNAL STRENGTH," the entirety of which are incorporated herein by reference.

SUMMARY

The present disclosure is directed, in part, to controlling beam parameters of a beam emitted from at least one antenna at a cell site to improve signal strength, substantially as shown in and/or described in connection with at least one of the figures, and as set forth more completely in the claims.

In aspects set forth herein, an antenna at a cell tower is configured to emit one or more beams covering a cell area servicing user device(s). Typically, a beam is emitted from an antenna at a cell site. A signal is then spread in all directions from the antenna, for example, to provide 5G coverage to user devices. Existing approaches may fail to account for coverage gaps associated with the emitted beams, and further may fail to provide an adequate remedy for improving coverage. As a result, existing approaches may fail to provide adequate coverage to priority user devices and/or user devices reporting a signal strength (e.g., indicative of the level of (5G) coverage) that deviates from historical signal strength values.

With this in mind, the aspects disclosed herein are directed to system and methods to improve signal strength (e.g., radio conditions indicative of a level of service coverage) among priority user devices and/or user devices reporting a signal strength that deviates from historical signal strength values. First, in accordance with aspects of the embodiments disclosed herein, a signal strength, a position, and/or a location of these priority user devices may be determined based on an angle of arrival and/or timing advance. As discussed herein, beam parameters (e.g., phase and amplitude) of the beam(s) servicing these priority user devices may be modified (along pre-defined steps) to change beam pattern until the priority user devices report signal strength (e.g., radio conditions) within target strength value.

Second, in accordance with aspects of the embodiments disclosed herein, historical signal strength values for user devices being serviced (e.g., receiving 5G coverage) from a beam are determined. As discussed herein, in response to a quantity of user devices having a respective signal strength outside of the one more historical signal strength values exceeding a threshold quantity of user devices, beam parameters of the beam are modified. As discussed herein, the beam parameters may be modified until the quantity of user devices having a respective signal strength outside of the one more historical signal strength values is within (e.g., below) the threshold quantity of user devices.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE SEVERAL VIEWS OF THE DRAWINGS

Illustrative embodiments of the present invention are described in detail below with reference to the attached drawing figures, and wherein.

DETAILED DESCRIPTION

Figure 1:
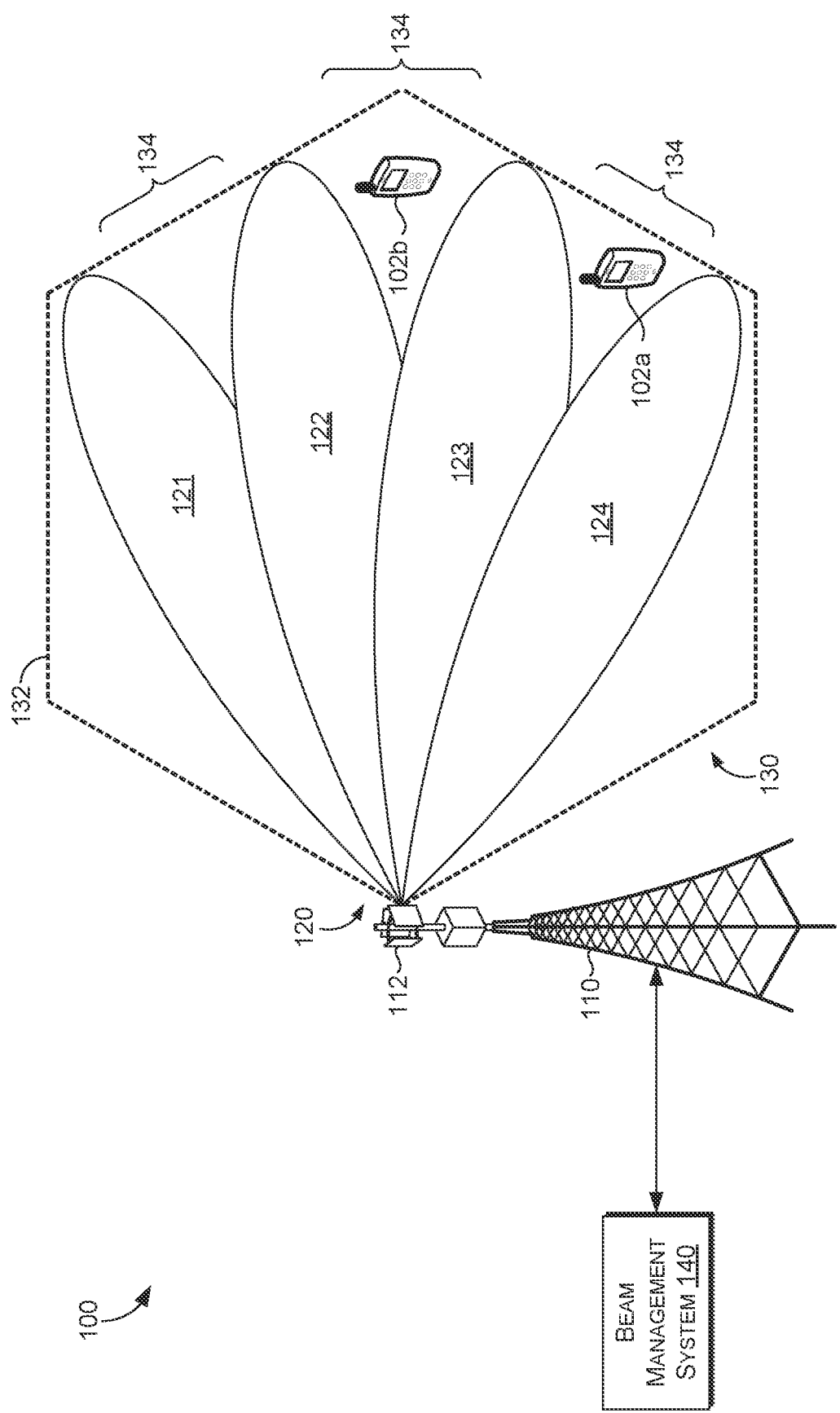
FIG. 1 depicts a schematic diagram of an example network environment, in accordance with one or more embodiments.

The subject matter of embodiments of the invention is described with specificity herein to meet statutory requirements. However, the description itself is not intended to limit the scope of this patent. The claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Typically, an antenna at a cell tower (e.g., cell site) is configured to emit one or more beams covering a cell area servicing user device(s). A signal is then spread in any number of directions from the antenna, for example, to provide 5G coverage to user devices. Existing approaches may fail to account for coverage gaps associated with the emitted beams, and further may fail to provide an adequate remedy for improving signal strength, for example, (1) to priority user devices, and/or (2) to user devices reporting respective signal strengths deviating from historical signal strength value(s). Although one solution may include building additional cell towers to provide additional coverage to improve signal strength, such a solution would be costly, requiring high capital expenses associated with the materials and labor expenses associated with erecting another tower. Even then, beams emitted by additional cell towers may interfere with beams emitted by existing cell towers, which may adversely affect signal strength. Accordingly, there is a need to improve signal strength to certain user devices in a more cost effective manner, the implementation of which is difficult to develop in practice.

With this in mind, the embodiments disclosed herein are directed to system and methods to improve signal strength (e.g., radio conditions) among priority user devices and/or user devices (e.g., a threshold number of user devices) reporting signal strength that fall outside historical signal strength values. In some implementations, the embodiments disclosed herein may provide a more cost-effective way to improve signal strength without the need for building additional cell towers, and instead, leveraging certain components on cell towers.

Advantageously, providing methods and systems for controlling a beam emitted from at least one antenna at a cell site of a telecommunication network (e.g., a 5G network) by utilizing the beam management system disclosed herein improves the allocation of beam coverage, enhances performance of user device performance, reduces energy waste, and improves network efficiencies, without requiring additional expenses, such as those associated with building additional towers. Indeed, beyond the additional expenses, building additional towers may result unwanted effects, such as interference, which may detrimentally affect network coverage.

In one aspect, a method is provided for controlling a beam parameter associated with a beam emitted from at least one antenna at a cell site. The method includes receiving, by a beam management system communicatively coupled to (i) a data repository associated server device and (ii) one or more user devices, an indication that a user device is associated with priority metrics. The method further includes receiving an indication of a position parameter indicative of a position of the user device and determining a signal strength associated with the beam based on the position of the user device. In response to determining that the signal strength associated with the beam is below a target signal strength value, the method includes modifying one or more beam parameters of the beam. The one or more beam parameters include at least one of a phase of the beam or an amplitude of the beam.

In another aspect, a computer-readable storage media having computer-executable instructions embodied thereon is provided that, when executed by one or more processors, cause the processors to perform various steps. The processors are caused to receive, by a beam management system communicatively coupled to a data repository of a server device and a plurality of user devices, an indication of one or more historical signal strength values for the plurality of user devices being served by a beam emitted from at least one antenna of a cell site. The processors are also caused to determine whether a quantity of user devices of the plurality of user devices having a signal strength outside a range defined by the one or more historical signal strength values exceeds a threshold quantity of user devices. In response to the quantity of user devices exceeding the threshold quantity, the processors are further caused to cause the at least one antenna to modify a beam parameter, such as a phase, amplitude, or both of the beam.

In yet another aspect, a system is provided for controlling an emitted beam. The system includes a cell site that includes at least one antenna and a beam management system. The beam management system is communicatively coupled to a first plurality of user device and a data repository of a server device. The system is configured to perform operations. The operations include receiving an indication of one or more historical signal strength values for a second plurality of user devices that have previously been served by a beam emitted from at least one antenna of a cell site. The operations further include determining whether a quantity of user devices of the first plurality of user devices having a signal strength outside of the one more historical signal strength values exceeds a threshold quantity of devices. In response to the quantity of user devices having the signal strength outside of the one more historical signal strength values exceeding the threshold quantity of devices, the operations include causing the at least one antenna to modify a beam parameter, such as a phase, amplitude, or both of the beam.

Throughout this disclosure, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of aspects herein.

Embodiments herein may be embodied as, among other things: a method, system, or set of instructions embodied on one or more computer-readable media. Computer-readable media include both volatile and nonvolatile media, removable and nonremovable media, and contemplate media readable by a database, a switch, and various other network devices. Computer-readable media includes media implemented in any way for storing information. Examples of stored information include computer-useable instructions, data structures, program circuitry, and other data representations. Media examples include RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently. Embodiments may take the form of a hardware embodiment, or an embodiment combining software and hardware. Some embodiments may take the form of a computer-program product that includes computer-useable or computer-executable instructions embodied on one or more computer-readable media.

"Computer-readable media" may be any available media and may include volatile and nonvolatile media, as well as removable and non-removable media. By way of example, and not limitation, computer-readable media may include computer storage media and communication media.

"Computer storage media" may include, without limitation, volatile and nonvolatile media, as well as removable and non-removable media, implemented in any method or technology for storage of information, such as computer-readable instructions, data structures, program circuitry, or other data. In this regard, computer storage media may include, but is not limited to, Random-Access Memory (RAM), Read-Only Memory (ROM), Electrically Erasable Programmable Read-Only Memory (EEPROM), flash memory or other memory technology, CD-ROM, digital versatile disks (DVDs) or other optical disk storage, magnetic cassettes, magnetic tape, magnetic disk storage, or other magnetic storage devices, or any other medium which may be used to store the desired information and which may be accessed by the computing device 700 shown in FIG. 7. Computer storage media does not comprise a signal per se.

"Communication media" may include, without limitation, computer-readable instructions, data structures, program circuitry, or other data in a modulated data signal, such as a carrier wave or other transport mechanism, and may include any information delivery media. As used herein, the term "modulated data signal" refers to a signal that has one or more of its attributes set or changed in such a manner as to encode information in the signal. By way of example, and not limitation, communication media includes wired media such as a wired network or direct-wired connection, and wireless media such as acoustic, radio frequency (RF), infrared, and other wireless media. Combinations of any of the above also may be included within the scope of computer-readable media.

A "network" refers to a network comprised of wireless and wired components that provide wireless communications service coverage to one or more user equipment (UE). The network may comprise one or more base stations, one or more cell sites (i.e., managed by a base station), one or more cell towers (e.g., having an antenna) associated with each base station or cell site, a gateway, a backhaul server that connects two or more base stations, a database, a power supply, sensors, and other components not discussed herein, in various embodiments.

The terms "base station" and "cell site" may be used interchangeably herein to refer to a defined wireless communications coverage area (e.g., a geographic area) serviced by a base station. It will be understood that one base station may control one cell site or alternatively, one base station may control multiple cell sites. As discussed herein, a base station is deployed in the network to control and facilitate, via one or more antenna arrays, the broadcast, transmission, synchronization, and receipt of one or more wireless signals in order to communicate with, verify, authenticate, and provide wireless communications service coverage to one or more UE that request to join and/or are connected to a network.

An "access point" may refer to hardware, software, devices, or other components at a base station, cell site, and/or cell tower having an antenna, an antenna array, a radio, a transceiver, and/or a controller. Generally, an access point may communicate directly with user equipment according to one or more access technologies (e.g., 3G, 4G, LTE, 5G, mMIMO (massive multiple-input/multiple-output)) as discussed herein.

The terms "user equipment," "UE," and/or "user device" are used interchangeably to refer to a device employed by an end-user that communicates using a network. UE generally includes one or more antenna coupled to a radio for exchanging (e.g., transmitting and receiving) transmissions with a nearby base station, via an antenna array of the base station. In embodiments, UE may take on any variety of devices, such as a personal computer, a laptop computer, a tablet, a netbook, a mobile phone, a smart phone, a personal digital assistant, a wearable device, a fitness tracker, or any other device capable of communicating using one or more resources of the network. UE may include components such as software and hardware, a processor, a memory, a display component, a power supply or power source, a speaker, a touch-input component, a keyboard, and the like. In embodiments, some of the UE discussed herein may include current UE capable of using 5G and having backward compatibility with prior access technologies (e.g., Long-Term Evolution (LTE)), current UE capable of using 5G and lacking backward compatibility with prior access technologies, and legacy UE that is not capable of using 5G.

The terms "radio," "controller," "antenna," and "antenna array" are used interchangeably to refer to one or more software and hardware components that facilitate sending and receiving wireless radio-frequency signals, for example, based on instructions from a base station. A radio may be used to initiate and generate information that is then sent out through the antenna array, for example, where the radio and antenna array may be connected by one or more physical paths. Generally an antenna array comprises a plurality of individual antenna elements. The antennas discussed herein may be dipole antennas, having a length, for example, of ¼, ½, 1, or 1½ wavelength. The antennas may be monopole, loop, parabolic, traveling-wave, aperture, yagi-uda, conical spiral, helical, conical, radomes, horn, and/or apertures, or any combination thereof. The antennas may be capable of sending and receiving transmission via full dimension-(FD) MIMO, Massive MIMO, 3G, 4G, 5G, and/or 802.11 protocols and techniques.

As used herein, the terms "service provider," "cell service provider," "mobile service provider," and "operator" are used to interchangeably refer to an entity (e.g., company, enterprise, or business organization) offering transmission services to users of user devices, such as wireless smartphones, tablets, computing devices, and the like. The service provider may transmit services to user devices through radio frequency (RF) signals rather than though end-to-end wire communication. Services provided may differ across the services providers in terms of wireless service plans, data speeds (e.g., 3G, 4G, and/or 5G), reliability, coverage, and user devices they support, to name a few.

Additionally, it will be understood that terms such as "first," "second," and "third" are used herein for the purposes of clarity in distinguishing between elements or features, but the terms are not used herein to import, imply, or otherwise limit the relevance, importance, quantity, technological functions, sequence, order, and/or operations of any element or feature unless specifically and explicitly stated as such. Along similar lines, certain UE are described herein as being "priority" UE and non-priority UE, but it should be understood that in certain implementations UE may be distinguished from other UEs based on any other different or additional features or categorizations (e.g., computing capabilities, subscription type, and the like).

The terms "servicing" and "providing signal coverage," "providing network coverage," and "providing coverage," are interchangeably used to mean any (e.g., telecommunications) service(s) being provided to user devices. Moreover, "signal strength", "radio conditions," "level of coverage," and like, are interchangeably used herein to refer to a connection strength associated with a user device. For example, these terms may refer to radio conditions between a user device and a beam providing coverage to the user device. In particular, the "signal strength," "level of coverage," and like may be expressed in terms of synchronization signal (SS) measurements/values and/or channel state information (CSI) measurements/values. In the context of 5G, signal strength may be measured by user devices, which may communicate the signal strength to the cell site and/or the beam management system disclosed herein. In particular, a user device may report various measurements. For example, a user device may provide signal strength as certain synchronization signal (SS) measurements, such as a SS reference signal received power (SS-RSRP) value/measurement, a SS Reference Signal Received Quality (SS-RSRQ) value/measurement, a SS signal-to-noise and interference ratio (SS-SINR) value/measurement, and/or the like. Alternatively or additionally, in some embodiments, signal strength may also be measured and provided in terms of channel state information (CSI) values.

With the aforementioned in mind, FIG. 1 illustrates an example of a network environment 100 suitable for use in implementing embodiments of the present disclosure. The network environment 100 is one example of a suitable network environment and is not intended to suggest any limitation as to the scope of use or functionality of the disclosure. Neither should the network environment 100 be interpreted as having any dependency or requirement relating to any one or combination of components illustrated.

The network environment 100 provides service to one or more user devices 102. As illustrated and described in detail below, the network environment 100 may provide services to a user device 102a (e.g., non-priority user device) and a priority user device 102b. In some embodiments, the network environment 100 may be a telecommunication network (e.g., a telecommunication network such as, but not limited to, a wireless telecommunication network), or portion thereof. The network environment 100 may include one or more devices and components, such as base stations, servers, switches, relays, amplifiers, databases, nodes, etc. which are not shown so as to not confuse other aspects of the present disclosure. (Example components and devices are discussed below with respect to FIGS. 7 and/or 8.) Those devices and components may provide connectivity in a variety of implementations. In addition, the network environment 100 may be utilized in a variety of manners, such as a single network, multiple networks, or as a network of networks, but, ultimately, is shown as simplified as possible to avoid the risk of confusing other aspects of the present disclosure.

The network environment 100 may include or otherwise may be accessible through a cell site 110. The cell site 110 may include one or more antennas 112, base transmitter stations, radios, transmitter/receivers, digital signal processors, control electronics, GPS equipment, power cabinets or power supply, base stations, charging stations, and the like. In this manner, the cell site 110 may provide a communication link between the one or more user devices 102 and any other components, systems, equipment, and/or devices of the network environment 100 (e.g., the beam management system). The base station and/or a computing device (e.g., whether local or remote) associated with the base station may manage or otherwise control the operations of components of the cell site 110. Example components that may control the operations of components of the cell site 110 are discussed below with respect to FIGS. 7 and/or 8.

The one or more antennas 112 may emit any number of beams 120 covering a geographic area. The one or more antennas 112 are capable of using beamforming as at least one signal processing operation (e.g., technique). The beams 120 may be operable in one or more beam modes. As a first example, in a standalone mode, the network environment 100 may take the form of a 5G network or any other suitable network. In some embodiments, the cell site 110 may be operable in a non-standalone mode. As a second example, in the non-standalone (NSA) mode, the network environment 100 may take the form of, for example, an E-UTRAN New Radio-Dual Connectivity (EN-DC) network. In an EN-DC network, a user device (e.g., the user device(s) 102) may connect to or otherwise access a 4G, LTE, 5G, 5G NR, or any other suitable network simultaneously.

As may be appreciated by a person having ordinary skill in the art, a 5G network environment has beam-based coverage unlike traditional cell-based in LTE. In particular, a 5G network may be created by way of the antenna 112 emitting a synchronization signal block (SSB) beam (herein referred to as "beam 120"), such as the four beams 121, 122, 123, 124. The beams 120 emitted by the antenna 112 may form a grid of beams providing coverage to a coverage area 130. For example, as illustrated, the four beams 121, 122, 123, 124 may form a hexagonal grid (of beams) 132. In some embodiments, the beams 120 may be static and pointing in the same direction, for example, relative to a position of the antenna 112.

Although the illustrated embodiment of FIG. 1 includes a hexagonal grid 132 created by four beams 121, 122, 123, and 124, it should be understood that any number of beams may provide coverage to a coverage area 130. Using 3GPP as an example, 3GPP defines a number of predefined SSB beams (directions) in the SS burst set and the number of predefined SSB beams are based on a frequency. In particular, four beams may be generated for a frequency up to 3 gigahertz (GHz); eight beams may be generated for a frequency range between 3 GHz to 6 GHz; and sixty-four beams may be generated for a frequency range between 6 GHz to 52.6 GHz. Thus, in some embodiments, the coverage area 130 may be serviced by four beams 120, eight beams 120, or sixty-four beams 120. However, it should be understood that certain beams may be disabled, such that the cell site may emit any number of beams (other than four, eight, or sixty-four, for example) to service the coverage area.

Continuing the example illustrated in FIG. 1, service providers who implement NR in low band, such as 5G NR Band n71, may have maximum of four beams 120 (e.g., SSB beams). These four beams 120 may serve a wide area in order of kilometers (km). "5G NR Band n71" refers to a FR1 5G NR Band, which follows frequency division duplexing (FDD) mode. The corresponding separate uplink band (e.g., having a frequency between 663-698 MHz) and downlink bands (e.g., having a frequency between 663-698 MHz) allow for simultaneous transmission on two frequencies. The four emitted beams 120 could leave coverage gaps 134 at beams edges; namely, at areas that are not covered by the four emitted beams 121, 122, 123, 124. In some embodiments, the coverage gaps 134 may result when users are inside traditional coverage planned hexagon area. For example, additional coverage gaps may result in response to service providers implementing lower than maximum 3GPP allowed SSB beams to (1) save user device battery, (2) reduce gNB/radio power consumption, and/or (3) accommodate cheaper or older radios with less antenna elements. This could result in even bigger coverage gaps.

In some embodiments, the network environment 100 may include a beam management system (e.g., the beam management system 140). The beam management system 140 may include (or be communicatively coupled to) one or more nodes communicatively coupled to the user device(s) 102 such that the beam management system 140 may transmit to and/or receive requests and/or data from one or more user devices 102. The one or more nodes may include a Next Generation Node B (e.g., gNodeB or gNB) or any other suitable node structured to communicatively couple to the user device(s) 102. The one or more nodes may correspond to one or more frequency bands, such as the frequency bands discussed above. A frequency is the number of times per second that a radio wave completes a cycle. The frequency band may include a frequency range (e.g., a lower frequency and an upper frequency) within which the user device(s) may connect to the network environment such as, but not limited to, a telecommunication network or a portion thereof. The frequency range may be measured by the wavelength in the range or any other suitable wave properties.

In some embodiments, the user device 102 may take the form of a wireless or mobile device capable of communication via the network environment 100. For example, the user device 102 may take the form of a mobile device capable of communication via a telecommunication network such as, but not limited to, a wireless telecommunication network. In this regard, the user device 102 may be any mobile computing device that communicates by way of a network, for example, a 3G, CDMA, 4G, LTE, WiMAX, 5G or any other type of network. The network environment 100 may include any communication network providing voice and/or data service(s), such as, for example, a 1× circuit voice, a 3G network (e.g., Code Division Multiple Access (CDMA), CDMA 2000, WCDMA, Global System for Mobiles (GSM), Universal Mobile Telecommunications System (UMTS), a 4G network (LTE, Worldwide Interoperability for Microwave Access (WiMAX), High-Speed Downlink Packet Access (HSDPA)), or a 5G network.

With this in mind, in some embodiments, the network environment 100 may be structured to connect subscribers (e.g., user devices 102) to a service provider or a plurality of service providers. Alternatively or additionally, the network environment 100 may be associated with a specific telecommunication provider that provides services (e.g., 3G, 4G, 5G, voice, location, and the like) to one or more user devices 102. For example, the user devices 102 may be subscribed to a telecommunication service provider, in which the user devices 102 are registered or subscribed to receive voice and data services over the network environment 100. Indeed, a telecommunications service provide may assign and provide services (e.g., coverage) to the user devices 102 based on a priority metric associated with a corresponding user device 102.

"Priority metric," as used herein, refers to any information indicating a plan to which a user devices 102 is subscribed and may related to a preferential status of the user device relative to other user devices. For example, a user device 102b may be subscribed and/or associated to a premium service subscription and may receive fixed wireless access (FWA). To deliver coverage consistent with the more expensive premium service subscription, the telecommunications service may wish to provide seamless and uninterrupted coverage to these priority user devices 102b. Although these priority user devices may be located in the coverage gaps 134 (e.g., between beams 120), existing approaches may over allocate gNB radio resources to these priority user devices 102b to compensate for their poor signal strength at the expense of a majority of other user devices.

Even for user devices 102a that lack the priority metrics, in some instance, issues arise when more user devices 102 concentrate in the coverage gaps 134. For example, a theatric event, a music concert, or a sporting event hosted in a location within the coverage gaps 134 may result in user devices 102 reporting poor signal strength. Even if the concentration of user devices 102 in the coverage gaps is temporary, such concentration of user devices 102 in coverage gaps 134 may result in network connection disruptions, slow download speeds, and a negative user experience, to name a few resulting issues.

Having described the network environment 100 and components operating therein, it will be understood by a person having ordinary skill in the art that the network environment 100 is but one example of a suitable network and is not intended to limit the scope of use or functionality of aspects described herein. Similarly, the network environment 100 should not be interpreted as imputing any dependency and/or any requirements with regard to each component and combination(s) of components illustrated in FIG. 1. It will be appreciated by a person having ordinary skill in the art that the number, interactions, and physical location of components illustrated in FIG. 1 are examples, as other methods, hardware, software, components, and devices for establishing one or more communication links between the various components may be utilized in implementations of the present disclosure. It will be understood to a person having ordinary skill in the art that the components may be connected in various manners, hardwired or wireless, and may use intermediary components that have been omitted or not included in FIG. 1 for simplicity's sake. As such, the absence of components from FIG. 1 should not be interpreted as limiting the present invention to exclude additional components and combination(s) of components. Moreover, though components may be represented as singular components or may be represented in a particular quantity in FIG. 1, it will be appreciated that some aspects may include a plurality of devices and/or components such that FIG. 1 should not be considered as limiting the quantity of any device and/or component.

Figure 2:
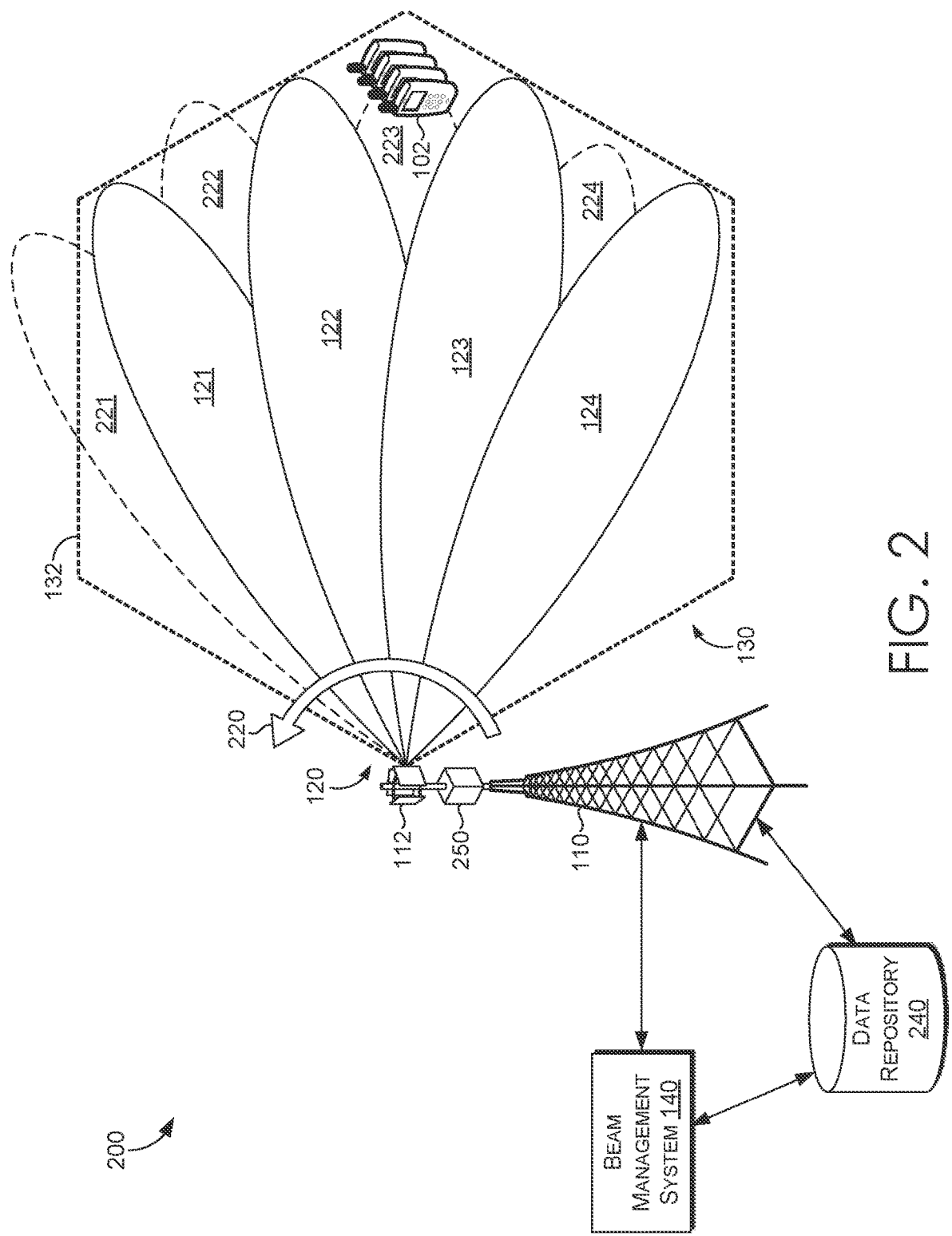
FIG. 2 depicts a schematic diagram of an example network environment employing a beam management system configured to modify beam parameters, in accordance with one or more embodiments.

FIG. 2 is a schematic diagram of an example network environment 200 (e.g., a telecommunication network such as, but not limited to, a wireless telecommunication network) employing a beam management system configured to modify beam parameters, in accordance with one or more embodiments. In the present embodiment, the network environment 200 includes the cell site 110, antenna 112, beam 120, beam management system 140, the one or more user devices 102, four emitted beams 120 (i.e., the first beam 121, the second beam 122, the third beam 123, and the fourth beam 124), a shifted/modified beam set 220 (i.e., the shifted first beam 221, the shifted second beam 222, the shifted third beam 223, and the shifted 224), a data repository 240, and a tower actuator 250. Although some of the components in the network environment 200 are depicted as single components (e.g., a single antenna, cell site, beam, or beam management system), in some embodiments, the network environment 200 may include a plurality of such components from 1 to N. Similarly, although some components in the network environment 200 are depicted as a specific plurality (e.g., four beams 120 and a plurality of user devices 102), in some embodiments, the network environment 200 may include a single or a different number of such component. For example, it should be understood that any number of suitable beams may be used to provide coverage to any suitable number of user devices 102 (e.g., the user devices 102a and the priority user device 102b of FIG. 1).

The beam management system 140 may include (or be communicatively coupled to) one or more nodes. For example, the beam management system 140 may include or otherwise take the form of a 5G massive MIMO capable gNodeB (e.g., the gNodeB is communicatively coupled to an antenna structured for mMIMO). In some embodiments, the beam management system 140 may be included within the cell site 110, external to the cell site 110, or otherwise communicatively coupled to the cell site 110. The beam management system 140 may allocate radio frequency, or a portion thereof, to user device(s) 102. In some embodiments, the beam management system 140 may be structured to manage the operation (e.g., the MIMO operation, massive MIMO operation, etc.) of one or more antennas (e.g., the antenna 112). The one or more antennas 112 may emit the beams 120, which may be operable in accordance with certain beam parameters. As used herein, "beam parameters" may refer to an amplitude of the beam, a phase of the beam, or any other suitable property of the beam 120, which the beam management system 140 may modify to alter a beam pattern (e.g., 3-dimensional (3D) beam pattern) of the beam(s) 120.

The beam management system 140 may digitally control beam parameters, such as the amplitude, the phase, or other suitable property of the beams 120, for example, based on real-time channel state information (CSI) from user devices 102. As illustrated, the beam management system 140 may control the amplitude, the phase, or other suitable beam parameters of beams 120 (e.g., the first beam 121, the second beam 122, the third beam 123, and the fourth beam 124) to create a new beam patterns shown as the shifted/modified beam set 220 (e.g., the shifted first beam 221, the shifted second beam 222, the shifted third beam 223, and the shifted 224). As illustrated, whereas the initial beams 120 may not provide adequate coverage to the user device(s) 102 (e.g., because the user devices were in the coverage gaps 134 of FIG. 1), the shifted beam set 220 may provide improved coverage to the user devices 102 (e.g., by providing coverage to the previous coverage gaps 134). In addition, the cell site 110 may include a tower actuator 250 configured to receive control signal that allow the antenna 112 to translate or rotate along any suitable 3-D directional space. In this manner, the position of the beams 120 may further be controlled by modifying a position or orientation of the antenna 112.

Alternatively or additionally, the beam management system 140 may manage the signaling (e.g., Orthogonal Frequency-Division Multiplexing (OFDM) signaling) within the network 200. The beam management system 140 may manage a Radio Access Network (RAN) or any other suitable network.

In some aspects, the data repository 240 may be communicatively coupled to beam management system 140 and the cell site 110. The data repository 240 may include any relational or non-relational data structure configured to store any suitable information. The data repository 240 may store an indication of priority metrics associated with a user device 102. The data repository 240 may store historical signal strength value(s) corresponding to different patterns of beams 120 at different instances in time. Accordingly, the historical signal strength value(s) may serve as an indication of a customer-expected signal strength. In one embodiment, the historical signal strength value(s) may define an acceptable or target range of signal strength. For example, any number of historical signal strength values may define any number of ranges indicative of different levels or categories of signal strength. As discussed below with respect to FIG. 5, the beam management system 140 may control beam parameters based on the historical signal strength until the signal strength associated with the beam(s) 120 is within the customer-expected signal strength (e.g., within the historical signal strength values).

In one aspect, the historical signal strength values may include an average of SS measurements and/or CSI measurements reported by user devices 102 being serviced during a period of time (e.g., over one or more days, weeks, months, years, and the like). For example, the historical signal strength value may correspond to a first calculation/value corresponding to a mean, median, or mode for SS-RSRP, a second calculation/value corresponding to a mean, median, or mode for SS-RSRQ, and a third calculation/value corresponding to a mean, median, or mode for SS-SINR. As another example, the historical signal strength value may correspond a weighted average of the SS-RSRP measurement, the SS-RSRQ measurement, and/or the SS-RSRQ measurement.

In either cases, the historical signal strength value may be specific to a period of time. In some embodiments, the historical signal strength value may provide an indication of a signal strength of all user devices being services by a particular beam pattern (e.g., the four beams 120 of FIG. 1 or 2) at a period of time. For example, the historical signal strength value may provide an indication of a suitable or customer-expected signal strength for between peak work hours (e.g., Monday-Friday between 9 am CDT and 5 pm CDT, respectively) or non-peak hours (e.g., weekends). In this example, the historical signal strength value may be based on SS measurements taken over a period of time (e.g., one year), and may be specific to another period of time (e.g., peak work hours).

As discussed in more detail below, the beam management system 140 may modify the beam parameters to improve signal strength reported by certain user devices to improve the user experience. The beam management system 140 may modify the beam parameters to provide coverage to user devices 102 that were positioned in coverage gaps 134 and therefore reporting poor signal strength. For example, in FIG. 2, the beam management system 140 modifies the beam parameters associated with the four beams 120 to shift their pattern to that of the shifted beam set 220. In one embodiment, the beam management system 140 modifies the beam parameters along a pre-set or customizable step. For example, the beam management system 140 may modify the phase in one-degree increments (or any other suitable measurement value for a phase), the amplitude in one-watt or one-decibel (dBm) increments (or any other suitable measurement value for an amplitude), and the like.

Figure 3:
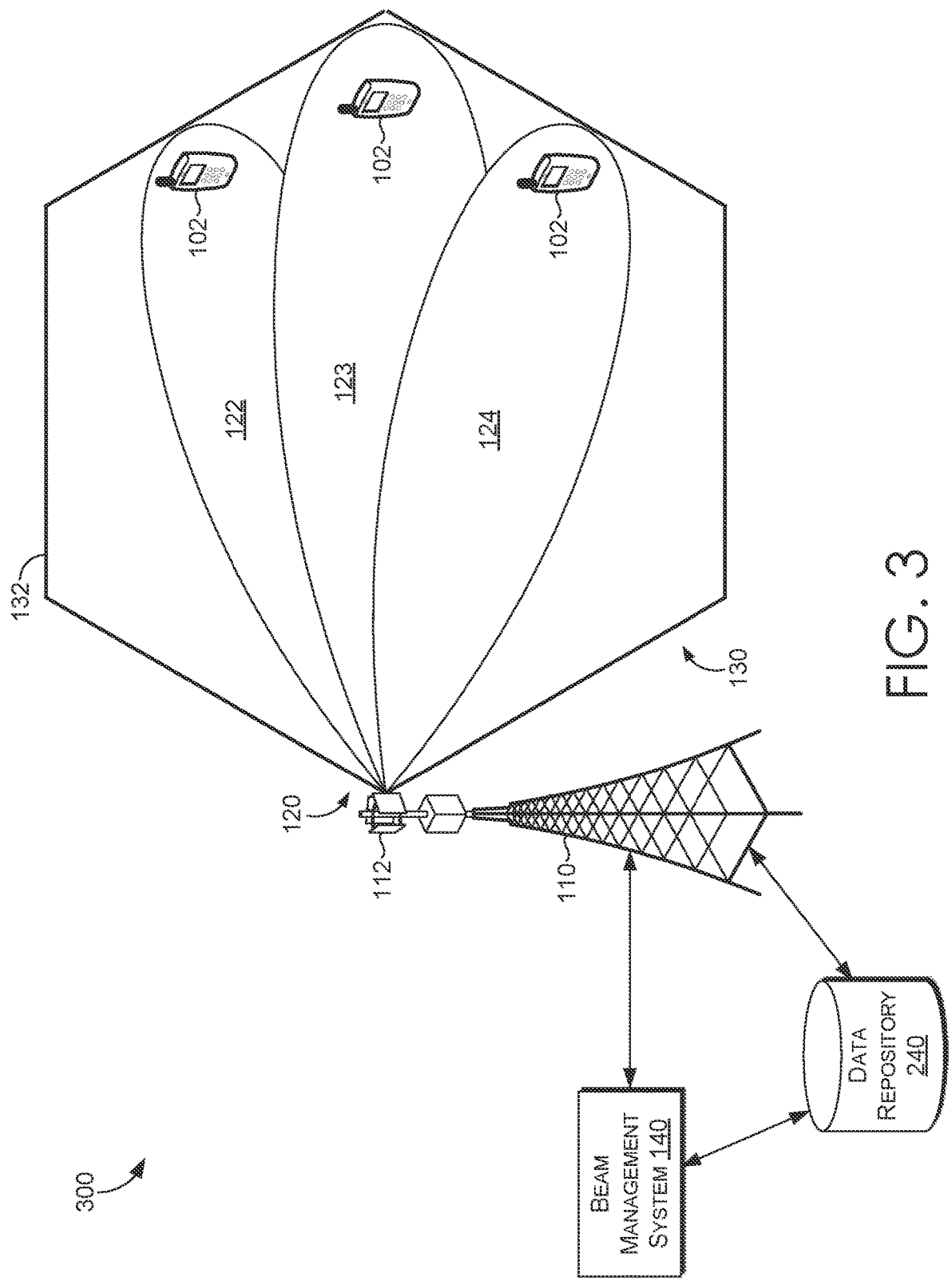
FIG. 3 depicts a schematic diagram of an example network environment employing a beam management system configured to modify beam parameters, in accordance with one or more embodiments.

As another example of changes to a beam pattern, FIG. 3 is a schematic diagram of an example network environment 300 (e.g., a telecommunication network such as, but not limited to, a wireless telecommunication network) employing a beam management system configured to modify beam parameters, in accordance with one or more embodiments. As illustrated, the beam management system 140 may modify the pattern of the four emitted beams 120 (from FIGS. 1-2) to disable one of the beams (e.g., the first beam 121), as discussed below with respect to FIG. 6. In certain embodiments, the beam management system 140 may disable a beam in response to determining that a user device 102 is not being serviced by any of the emitted beams 120. In this example, the first beam 121 has been disabled (e.g., because the area which the first beam 121 would be servicing does not include a user device 102), such that only the second beam 122, the third beam 123, and the fourth beam 124 are servicing and providing coverage to user devices 102 in the coverage area 130. In this manner, the pattern of the beams 120 may be adjusted to disable any number of beams to improve signal strength associated with the remaining beams that are emitted. For example, by employing less than four beams (e.g., for a frequency up to 3 GHz), the signal strength associated with the remaining beams may be improved, as illustrated by the increased size of the beams 122, 123, and 124 of FIG. 3 as compared to FIGS. 1-2.

To determine whether a particular beam 120 is servicing a user device 102, the beam management system 140 may determine the position of the user devices 102 being serviced by the beams 120. In one embodiment, the beam management system 140 may determine the position of the user devices 102 based on an angle of arrival and/or a timing advance associated with communication with the respective user devices 102. The beam management system 140 may then compare the position of the user devices 102 with the positions in the coverage area 130 for which the beams 120 provide coverage. In this manner, the beam management system 140 can determine whether a beam 120 is servicing any user devices 102 at that the determined position. The position of the user device 102 may be relative to the cell site, an area of coverage serviced by the beam emitted from the at least one antenna, and/or any coordinate space of a positioning system (e.g., global positioning system).

In certain embodiments, the beam management system 140 may cause the antenna 112 to disable one or more beams 120 in response to determining that the one or more beams 120 is not servicing a threshold quantity of user devices 102. In a one embodiment, the threshold quantity of user devices may be based on the total user devices identified in the coverage area 130 (e.g., the hexagonal coverage area 130 formed by the beam pattern of the beams 120). For example, the threshold quantity may correspond to a percentage of total user devices 102 in coverage area 130, such that if a beam is not servicing at least the percentage of total user devices 102 (e.g., 0.5%), then the beam management system 140 may disable the corresponding beam 120. The threshold quantity of user devices may be customized and set by a user. An indication of the specified threshold quantity of user devices may be stored in the data repository 240.

Although the illustrated embodiment depicts only one beam being disabled, it should be understood that the beam management system 140 may cause any number of beams 120 to be disabled. Moreover, although FIG. 3 is discussed in the context of a cell site 110 servicing an area with three beams (e.g., based on a frequency of less than 3 GHz), the beam management system 140 may disable beams for a cell site 110 servicing any suitable frequency. For example, a cell site 110 may provide coverage to a coverage area 130 with a frequency between 6 GHz to 52.6 GHz with sixty four beams, such that any of the sixty four beams may be disabled or modified/adjusted, as discussed herein.

Figure 4:
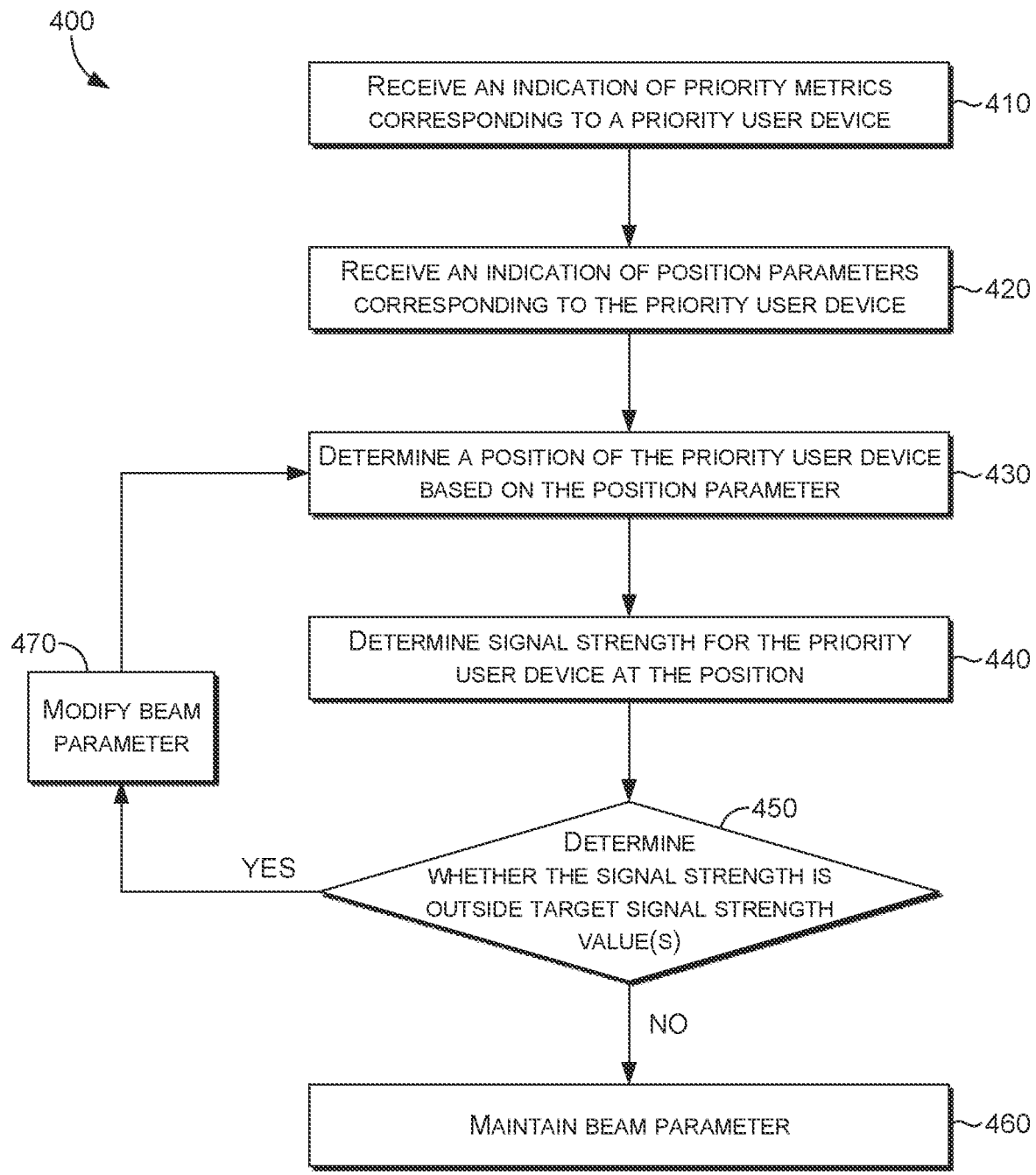
FIG. 4 depicts a flowchart of an exemplary method for controlling a beam emitted from at least one antenna at a cell site to improve signal strength for priority user devices, in accordance with one or more embodiments.

FIG. 4 depicts a flow diagram of an exemplary method 400 for controlling a beam emitted from at least one antenna (e.g. antenna 112 of FIGS. 1-3) at a cell site (e.g. cell site 110 of FIGS. 1-3) to improve signal strength for priority user devices (e.g., the priority user device 102b of FIG. 1), in accordance with one or more embodiments. Process 400 (and/or any of the functionality or processes described herein, such as but not limited to process 500 of FIG. 5 and process 600 of FIG. 6) may be performed by processing logic that comprises hardware (e.g., processing circuitry, dedicated logic, programmable logic, microcode), software (e.g., instructions run on a processor to perform hardware simulation), firmware, or a combination thereof. For example, process 400 (and/or any of the functionality or processes described herein, such as but not limited to process 500 of FIG. 5 and process 600 of FIG. 6) may be performed by any of the components described herein, such as the beam management system 140. Although particular blocks described in this disclosure are referenced in a particular order or a particular quantity, it is understood that any block may occur substantially parallel with or before or after any other block. Further, more (or fewer) blocks may exist than illustrated. Such added blocks may include blocks that embody any functionality described herein. The computer-implemented method, the system (that includes at least one computing device having at least one processor and at least one computer readable storage medium), and/or the computer storage median as described herein may perform or be caused to perform the processes 400, 500, 600 and/or any other functionality described herein.

The process 400 includes receiving (process block 410) an indication of priority metrics corresponding to a user device (e.g., user device 102 of FIGS. 1-3). The priority metrics may indicate that the user device corresponds to a priority user device. Any suitable core architecture may be employed to communicate to the beam management system 140 an indication of a relative priority of the user devices 102. Example core architectures include Access and Mobility Management Function (AMF), UPF (User Plane Function), SMF (Session Management Function). For example, a home location register (HLR) data structure may store various information associated with mobile subscribers of a network (e.g., networks 100, 200, and/or 300 of FIGS. 1-3). The HLR may include a service that dynamically contacts a central database (e.g., the data repository 240 of FIGS. 2-3) that contains details of each user device subscriber authorized to use the GSM core network. As another example, a home subscriber server (HSS) may store subscriber information. (e.g., in the data repository 240 of FIGS. 2-3 and/or) in one or more nodes to allow communication service providers (CSPs) to manage customers in real-time via a centralized data structure of policy-based access permissions. In one embodiment, the beam management system 140 may receive (e.g., from the HSS or HLR databases) priority metrics indicative of the profile or provision associated with a user device.

In certain embodiments, the indication of priority metrics may correspond to a Quality, of Service (QoS) Class Identifier (QCI). A QCI refers to a mechanism used in 3GPP Long Term Evolution (LTE) networks to control carrier traffic and ensure the proper allocation of an appropriate Quality of Service (QoS). Differs carrier traffic requires different QoS and therefore different QCI values. QCI value 9 may be used for the default carrier of a user device for non-privileged subscribers. However different QCI values may be assigned to priority user device 102b. Indeed, the beam management system 140 may receiving an indication of the QCI value to control beam pattern to deliver coverage and signal strength consistent with the corresponding QCI value of a user device 102. In some embodiments, the below referenced steps of the process 400 occur in response to determining e user device is a priority user device 102b.

Moreover, the process 400 includes receiving (process block 420) an indication of position parameters corresponding to the priority user device 102b. The position parameters tray include data communicated by the priority user device 102b useful in determining a position of the corresponding user device. For example, position parameters may include an angle of arrival and/or a timing advance associated with communications with a user device 102. Any suitable position parameter may be used to determine (process block 430) a position of the priority user device 102b.

Based on the determined position of the priority user device 102b, the process 400 includes determining (process block 440) a signal strength of the corresponding priority user devices 102b at that position. In some embodiments, an indication of the signal strength is received directly or indirectly from the priority user device 102b. Determining (process block 440) a signal strength may include receiving an indication of the signal strength from the priority user device 102b. For example, the priority user device 102b may communicate or provide certain synchronization signal (SS) measurements, such as SS-RSRP, SS-RSRQ, SS-SINR, and/or the like. Alternatively or additionally, in some embodiments, signal strength may also be measured and provided in terms of channel state information (CSI) values.

The process 400 further includes determining (decision block 450) whether the determined signal strength for the corresponding priority user device 102b is outside target signal strength value(s) (e.g., below a target strength signal threshold value). Determining (decision block 450) whether the determined signal strength is outside or within target signal strength values includes comparing the determined signal strength to the target signal strength values. In one embodiment, the units of the determined signal strength may be normalized or weighted to correspond to the units of the target signal strength values to allow for direct comparison.

As set forth above, the target signal strength values for priority user devices may be higher than for a non-priority user device. In one embodiment, the target strength value(s) may correspond to the QCI value dedicated to the corresponding priority user device. In one embodiment, the target strength value(s) may correspond to an upper value, a lower value, or both, of suitable strength value, for example, measured in terms of SS measurements, CSI values, or weighted averages of one or more of these measurements/values. If the strength for the priority device is determined (decision block 450) to be within the target signal strength value(s), the process 400 includes maintaining (process block 460) the beam parameters of the emitted beams 120. In one embodiment, maintaining the beam parameters include not changing the emitted beam 120 and/or maintaining a beam pattern of the beams 120.

On the other hand, in response to determining that the signal strength for the priority device is outside target signal strength values, the process 400 includes modifying (process block 470), the beam parameters. As discussed above, the beam parameters may be modified (process block 470) to provide coverage to priority user devices 102b that were positioned in coverage gaps 134 and therefore reporting poor signal strength (e.g., outside target signal strength values). In one embodiment, the beam management system 140 modifies the beam parameters along a pre-set or customizable step (e.g., an indication of which is stored in the data repository 240). For example, the beam management system 140 may modify the phase in one-degree increments (or any other suitable measurement value for a phase), the amplitude in one-watt or one-decibel (dBm) increments (or any other suitable measurement value for an amplitude), and the like. Modifying (process block 470) the beam parameter may include controlling the amplitude, the phase, or other suitable beam parameters of beams. The beam parameters may correspond to the collective beam set (e.g., the four beams 121, 122, 123, 124 of FIG. 1) or may correspond to each individual beam, such that modification of the beam parameters may change one beam or the beam set.

Figure 5:
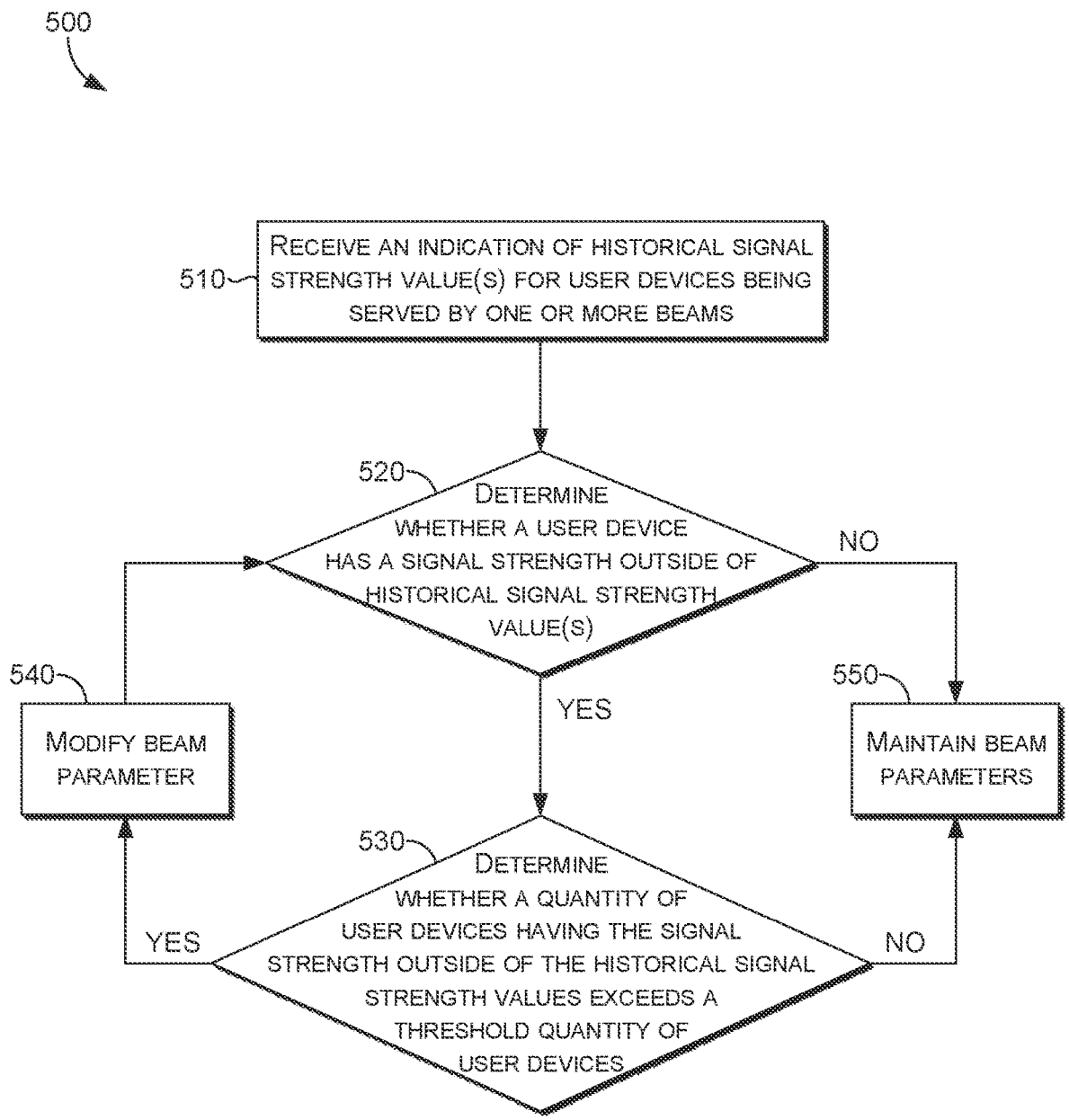
FIG. 5 depicts a flowchart of an exemplary method for controlling a beam emitted from at least one antenna at a cell site to improve signal strength associated with a concentration of user devices, in accordance with one or more embodiments.

Turning to FIG. 5, a flowchart is provided of an exemplary method 500 for controlling a beam emitted from at least one antenna at a cell site to improve signal strength to an abnormal concentration of user devices, in accordance with one or more embodiments. The process 500 includes receiving (process block 510) an indication of historical signal strength value(s) for user devices (e.g., user device 102 of FIGS. 1-3) being served by one or more beams (e.g., beams 120 of FIGS. 1-3). As discussed above, the historical signal strength values may serve as an indication of a customer-expected signal strength since it corresponds to historical mathematical correlations (e.g., average, median, mode of SS or CSI signal strength) at certain instances in time.

Process 500 may include determining (decision block 520) whether a user device 102 has a signal strength outside of historical signal strength values. Determining (decision block 520) whether a user device 102 has a signal strength outside of historical signal strength values may include comparing the signal strength of the user devices 102 being serviced by a beam (or beam set) with the historical signal strength values associated with the corresponding beam (or beam set) at a given time. As discussed above, the signal strength reported by a user device may be based on a location/position of the user devices, as well as the angle of arrival and/or timing advance. For example, the historical signal strength value(s) may include a weighted average of one or more of the SS-RSRP, SS-RSRQ, SS-SINR measurements calculated for any period (e.g., interval) of time and specific to a period of time and place (e.g., a weighted average calculated for the periods of 9:00 am CDT through 5:00 pm CDT from Monday-Friday for the past year). The signal strength (e.g., in terms of corresponding SS-RSRP, SS-RSRQ, SS-SINR measurements) for each user device 102 may be determined and compared against the historical signal strength value(s).

Process 500 further may include determining (decision block 530) whether a quantity (e.g., number) of user devices having the signal strength outside of the historical signal strength values exceeds a threshold quantity of user devices. For example, the threshold quantity of user devices may be set to fifty user devices, such that when more than fifty user devices are determined to have a signal strength outside of the historical signal strength values, the process 500 proceeds to process block 540.

In particular, the process 500 includes modifying (process block 540) the beam parameters as set forth above. In some embodiments, the beam parameters may be modified (process block 540) until the quantity of user devices reporting a signal strength outside of the historical signal strength values does not exceed a threshold quantity of user device. If no user devices 102 are reporting a signal strength outside historical signal strength values, then process 500 includes maintaining (process block 550) the beam parameters. Similarly, if the quantity of user devices reporting a signal strength outside of the historical signal strength values does not exceed a threshold quantity of user device, then the beam parameters are maintained (process block 550).

Figure 6:
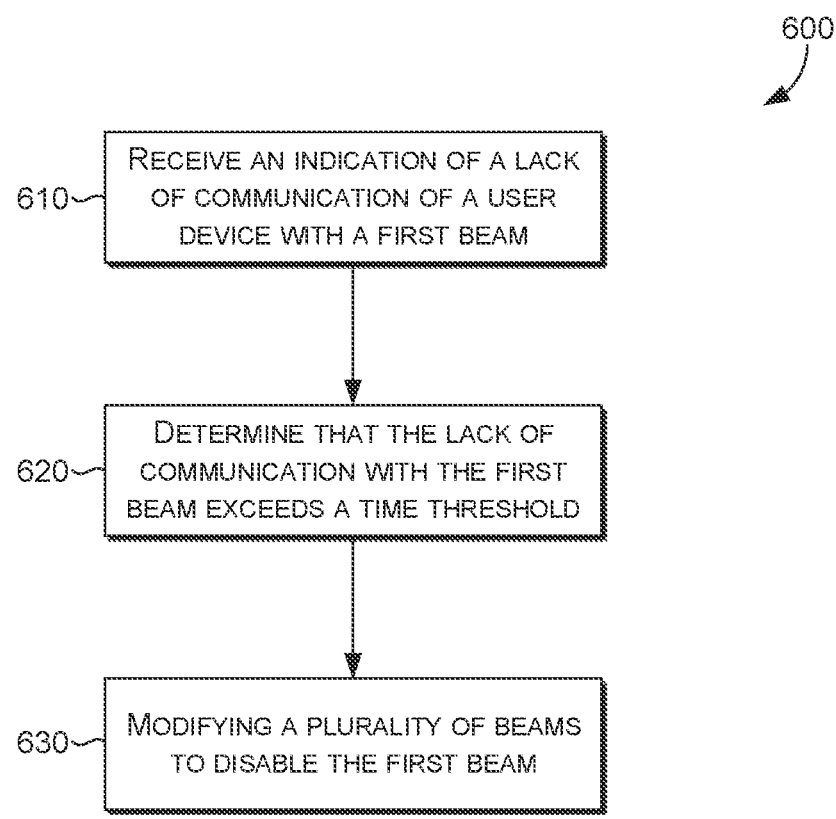
FIG. 6 depicts a flowchart of an exemplary method for controlling at least one antenna at a cell site to restrict emission of a beam, in accordance with one or more embodiments.

FIG. 6 is a flowchart of an exemplary method 600 for controlling at least one antenna at a cell site to temporarily restrict emission of a beam, in accordance with one or more embodiments. As discussed with respect to FIG. 3, the first beam 121 of FIGS. 1-2 may be omitted by employing process 600. Process 600 may include receiving (process block 610) an indication of a lack of communication of any user device (user device 102 of FIGS. 1-3) with a first beam. In some embodiments, receiving (process block 610) an indication of the lack of communication may include determining that a beam (e.g., beam 120 of FIGS. 1-3) not servicing and/or providing coverage to any user devices 102.

In some aspects, the process 600 includes determining (process block 620) that the lack of communication between the user device 102 and the first beam 121 exceeds a time threshold. The time threshold may correspond to a time duration threshold. For example, the time threshold may be six hours, such that a lack of communication between the user device and the first beam 121 lasting longer than six hours causes the process 600 to proceed.

In response to determining the lack of communication between any user device and the first beam (e.g., lasting longer than the time threshold), process 600 includes modifying (process block 630) a plurality of beams 120 to cause the first beam 121 to be disabled. For the example in which four beams are originally emitted (e.g., for a frequency up to 3 GHz), by employing less than four beams, the signal strength associated with the remaining beams may be improved, as illustrated by the increased size of the beams 122, 123, and 124 of FIG. 3 as compared to FIGS. 1-2.

Figure 7:
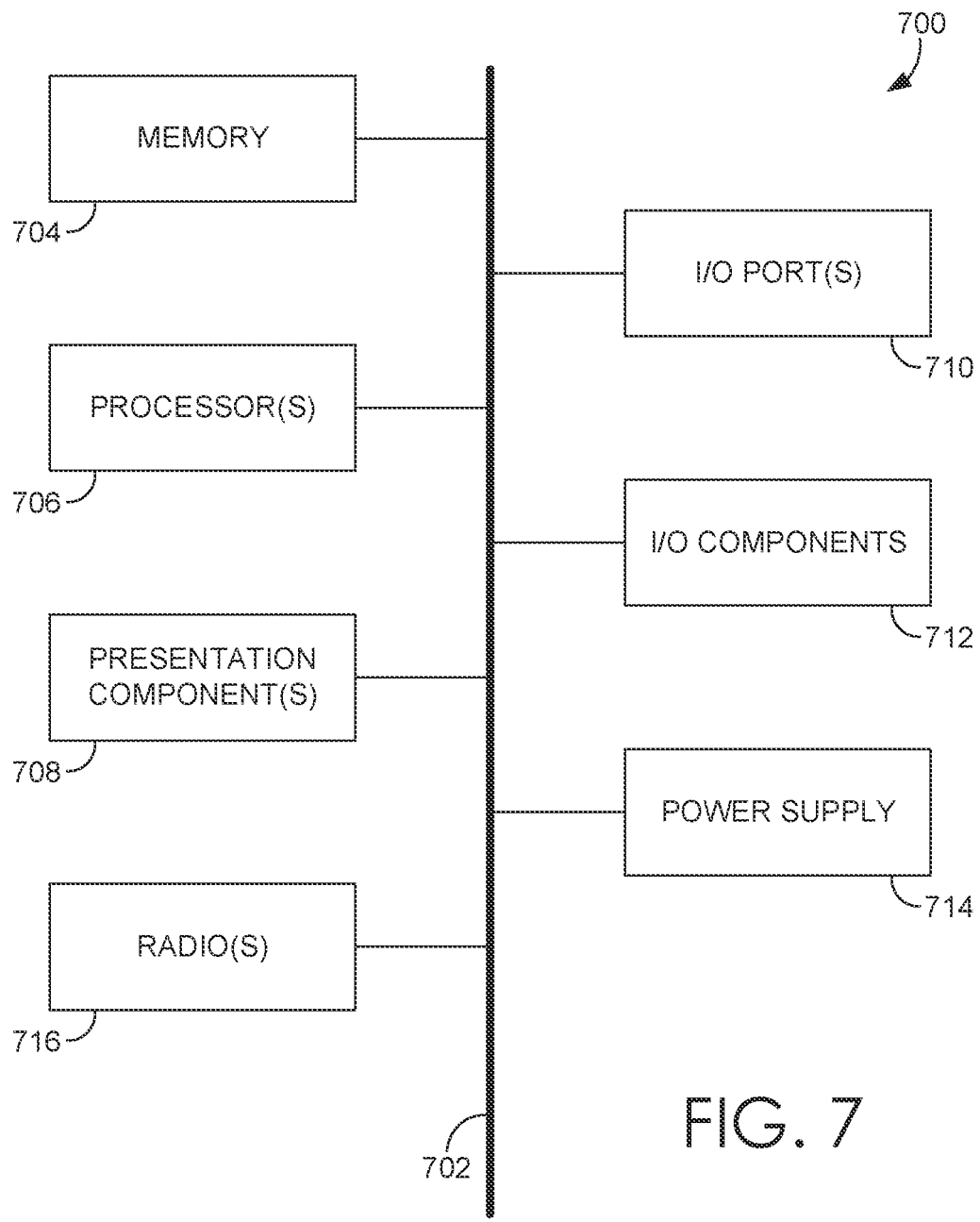
FIG. 7 depicts a block diagram of an exemplary computing device suitable for use in implementations of one or more embodiments of the present disclosure.

FIG. 7 depicts a block diagram of an exemplary computing device 700 suitable for use in implementations of one or more embodiments of the present disclosure. In particular, the exemplary computer environment is shown and designated generally as computing device 700. Computing device 700 is but one example of a suitable computing environment and is not intended to suggest any limitation as to the scope of use or functionality of the invention. Neither should computing device 700 be interpreted as having any dependency or requirement relating to any one or combination of components illustrated. In aspects, the computing device 700 may be a base station. In another embodiment, the computing device 700 may be UE capable of two-way wireless communications with an access point. Some non-limiting examples of the computing device 700 include a base station, a controller at a base station, a backhaul server, a personal computer, a cell phone, current UE, legacy UE, a tablet, a pager, a personal electronic device, a wearable electronic device, an activity tracker, a laptop, and the like.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

As shown in FIG. 7, computing device 700 includes a bus 702 that directly or indirectly couples various components together. The bus 702 may directly or indirectly one or more of memory 704, processor(s) 706, presentation component(s) 708 (if applicable), radio(s) 710, input/output (I/O) port(s) 712, input/output (I/O) component(s) 714, power supply 716, and/or transmitter(s) 718. Although the components of FIG. 7 are shown with lines for the sake of clarity, in reality, delineating various components is not so clear, and metaphorically, the lines would more accurately be grey and fuzzy. For example, one may consider a presentation component(s) 708 such as a display device to be one of I/O components 714. Also, the processor(s) 706 may include memory 704, in another example. The present disclosure hereof recognizes that such is the nature of the art, and reiterates that FIG. 7 is merely illustrative of an example of a computing device 700 that may be used in connection with one or more implementations of the present disclosure. Distinction is not made between such categories as "workstation," "server," "laptop," "handheld device," etc., as all are contemplated within the scope of the present disclosure and refer to "computer" or "computing device."

Memory 704 may take the form of memory components described herein. Thus, further elaboration will not be provided here, but it should be noted that memory 704 may include any type of tangible medium that is capable of storing information, such as a database or data store. A database or data store may be any collection of records, files, or information encoded as electronic data and stored in memory 704, for example. In one embodiment, memory 704 may include a set of embodied computer-readable and executable instructions that, when executed, facilitate various functions or elements disclosed herein. These embodied instructions will variously be referred to as "instructions" or an "application" for short.

Processor(s) 706 may be multiple processors that receive instructions and process them accordingly. Presentation component(s) 708, if available, may include a display device, an audio device such as a speaker, and/or other components that may present information through visual (e.g., a display, a screen, a lamp (LED), a graphical user interface (GUI), and/or even lighted keyboards), auditory, and/or other tactile or sensory cues.

Radio(s) 710 represents one or more radios that facilitate communication with a wireless telecommunication network. For example, radio(s) 710 may be connected to one or more antenna elements through a physical path. Illustrative wireless telecommunications technologies include CDMA, GPRS, TDMA, GSM, and the like. Radio(s) 710 might additionally or alternatively facilitate other types of wireless communications including Wi-Fi, WiMAX, 4G, 3G, 4G, LTE, mMIMO, 5G, NR, VoLTE, and/or other VoIP communications. As can be appreciated, in various embodiments, radio(s) 710 may be configured to concurrently support multiple technologies, as previously discussed herein. As such, each of many radio(s) 710 may be used to separately control portions of an antenna array, for example, where at least one portion utilizes a distinct technology relative to another portion in the same antenna array or at the same base station or cell site. A wireless telecommunication network might include an array of devices, which are not shown so as to not obscure more relevant aspects of the invention. Components such as a base station, a communications tower, or even access points (as well as other components) can provide wireless connectivity in some embodiments.

The input/output (I/O) ports 712 may take a variety of forms. Exemplary I/O ports 712 may include a USB jack, a stereo jack, an infrared port, a firewire port, other proprietary communications ports, and the like. Input/output (I/O) components 714 may comprise keyboards, microphones, speakers, touchscreens, and/or any other item usable to directly or indirectly input data into the computing device 700.

Power supply 716 may include batteries, fuel cells, and/or any other component that may act as a power source to supply power to the computing device 700 or to other network components, including through one or more electrical connections or couplings. Power supply 716 may be configured to selectively supply power to different components independently and/or concurrently.

Figure 8:
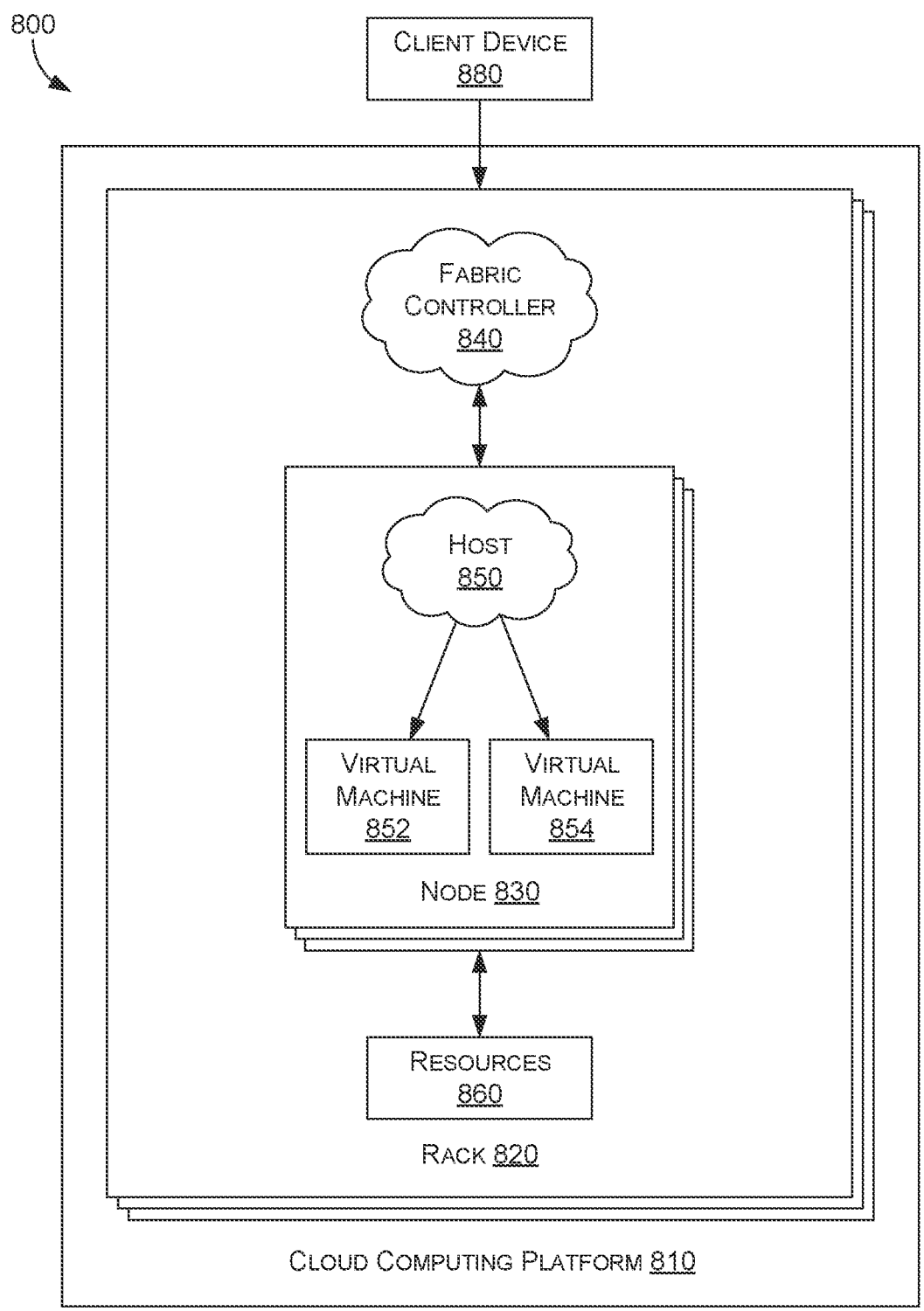
FIG. 8 depicts a block diagram of a computing environment in which one or more embodiments of the present disclosure may be employed.

Referring now to FIG. 8, FIG. 8 depicts a block diagram of a computing environment 800 in which one or more embodiments of the present disclosure may be employed. In particular, FIG. 8 shows a high level architecture of an example cloud computing platform 810 that can host a technical solution environment, or a portion thereof (e.g., a data trustee environment). It should be understood that this and other arrangements described herein are set forth only as examples. For example, as described above, many of the elements described herein may be implemented as discrete or distributed components or in conjunction with other components, and in any suitable combination and location.

Other arrangements and elements (e.g., machines, interfaces, functions, orders, and groupings of functions) can be used in addition to or instead of those shown.

Data centers can support distributed computing environment 800 that includes cloud computing platform 810, rack 820, and node 830 (e.g., computing devices, processing units, or blades) in rack 820. The technical solution environment can be implemented with cloud computing platform 810 that runs cloud services across different data centers and geographic regions. Cloud computing platform 810 can implement fabric controller 840 component for provisioning and managing resource allocation, deployment, upgrade, and management of cloud services. Typically, cloud computing platform 810 acts to store data or run service applications in a distributed manner. Cloud computing infrastructure 810 in a data center can be configured to host and support operation of endpoints of a particular service application. Cloud computing infrastructure 810 may be a public cloud, a private cloud, or a dedicated cloud.

Node 830 can be provisioned with host 850 (e.g., operating system or runtime environment) running a defined software stack on node 830. Node 830 can also be configured to perform specialized functionality (e.g., compute nodes or storage nodes) within cloud computing platform 810. Node 830 is allocated to run one or more portions of a service application of a tenant. A tenant can refer to a customer utilizing resources of cloud computing platform 810. Service application components of cloud computing platform 810 that support a particular tenant can be referred to as a multi-tenant infrastructure or tenancy. The terms service application, application, or service are used interchangeably herein and broadly refer to any software, or portions of software, that run on top of, or access storage and compute device locations within, a datacenter.

When more than one separate service application is being supported by nodes 830, nodes 830 may be partitioned into virtual machines (e.g., virtual machine 852 and virtual machine 854). Physical machines can also concurrently run separate service applications. The virtual machines or physical machines can be configured as individualized computing environments that are supported by resources 860 (e.g., hardware resources and software resources) in cloud computing platform 810. It is contemplated that resources can be configured for specific service applications. Further, each service application may be divided into functional portions such that each functional portion is able to run on a separate virtual machine. In cloud computing platform 810, multiple servers may be used to run service applications and perform data storage operations in a cluster. In particular, the servers may perform data operations independently but exposed as a single device referred to as a cluster. Each server in the cluster can be implemented as a node.

Client device 880 may be linked to a service application in cloud computing platform 810. Client device 880 may be any type of computing device, such as user device 102a described with reference to FIG. 1, and the client device 880 can be configured to issue commands to cloud computing platform 810. In embodiments, client device 880 may communicate with service applications through a virtual Internet Protocol (IP) and load balancer or other means that direct communication requests to designated endpoints in cloud computing platform 810. The components of cloud computing platform 810 may communicate with each other over a network (not shown), which may include, without limitation, one or more local area networks (LANs) and/or wide area networks (WANs).

Finally, regarding FIGS. 1 through 8, it will be understood by those of ordinary skill in the art that the environment(s), system(s), and/or methods(s) depicted are not intended to limit the scope of use or functionality of the present embodiments. Similarly, the environment(s), system(s), and/or methods(s) should not be interpreted as imputing any dependency and/or any requirements with regard to each component, each step, and combination(s) of components or step(s) illustrated therein. It will be appreciated by those having ordinary skill in the art that the connections illustrated the figures are contemplated to potentially include methods, hardware, software, and/or other devices for establishing a communications link between the components, devices, systems, and/or entities, as may be utilized in implementation of the present embodiments. As such, the absence of component(s) and/or steps(s) from the figures should be not be interpreted as limiting the present embodiments to exclude additional component(s) and/or combination(s) of components. Moreover, though devices and components in the figures may be represented as singular devices and/or components, it will be appreciated that some embodiments can include a plurality of devices and/or components such that the figures should not be considered as limiting the number of devices and/or components.

It is noted that aspects of the present invention are described herein with reference to block diagrams and flowchart illustrations. However, it should be understood that each block of the block diagrams and/or flowchart illustrations may be implemented in the form of a computer program product, an entirely hardware embodiment, a combination of hardware and computer program products, and/or apparatus, systems, computing devices/entities, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

Additionally, as should be appreciated, various embodiments of the present disclosure described herein can also be implemented as methods, apparatus, systems, computing devices/entities, computing entities, and/or the like. As such, embodiments of the present disclosure can take the form of an apparatus, system, computing device, computing entity, and/or the like executing instructions stored on a computer-readable storage medium to perform certain steps or operations. However, embodiments of the present disclosure can also take the form of an entirely hardware embodiment performing certain steps or operations.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned may be completed without departing from the scope of the claims below. Certain features and subcombinations are of utility and may be employed without reference to other features and subcombinations and are contemplated within the scope of the claims.

What is claimed is:

1. A method to control at least one beam emitted from at least one antenna at a cell site, the method comprising:
   receiving a first measurement report indicative of a first signal strength associated with a first beam that is emitted from the at least one antenna at the cell site and that is not servicing a user equipment (UE);
   based on the first signal strength being outside a range of target strength values, causing the at least one antenna to emit a second beam that (1) has a beam parameter modified as compared to the first beam and that (2) has a second signal strength; and
   subsequent to the second beam being emitted, receiving a second measurement report associated with the second beam, the second measurement report including a first indication indicating that the second beam is servicing the UE and a second indication indicating that the second signal strength associated with the second beam is within the range of target strength values or closer to the range of target strength values as compared to the first beam.

2. The method of claim 1, wherein the beam parameter comprises at least one of a phase or an amplitude, wherein the at least one of the phase or the amplitude is modified to change a beam shape to transform the first beam into the second beam.

3. The method of claim 1, comprising:
   accessing, from the first measurement report, a first position parameter indicative of a first position of the UE;
   determining the first signal strength associated with the first beam based on the first position parameter indicative of the first position of the UE;
   accessing, from the second measurement report, a second position parameter indicative of a second position of the UE; and
   determining the second signal strength associated with the second beam based on the second position parameter indicative of the second position of the UE.

4. The method of claim 1, wherein the second beam is emitted until the second signal strength is within the range or closer to the target strength values as compared to the first beam.

5. The method of claim 1, wherein the first signal strength being outside the range of target strength values comprises the first signal strength being below, above, or between at least one historical signal strength value comprises an average, median, or mode over a time interval for at least one of:
   Synchronization Signal reference signal received power (SS-RSRP);
   Secondary synchronization Signal Reference Signal Received Quality (SS-RSRQ); or
   Synchronization Signal-to-Noise and Interference Ratio (SS-SINR).

6. The method of claim 1, comprising determining at least one of the first signal strength or the second signal strength based on at least one of (i) Synchronization Signal Reference Signal Received Power (SS-RSRP), (ii) SS Reference Signal Received Quality (SS-RSRQ), or (iii) SS Signal-to-Noise and Interference Ratio (SS-SINR).

7. The method of claim 1, comprising determining that the first signal strength associated is outside the range of target strength values, wherein determining that the first signal strength associated is outside the range of target strength values comprises determining that the UE is not being serviced by the first beam.

8. The method of claim 1, comprising determining, based on a priority metric of the UE, that the UE corresponds to a priority UE having a higher priority than another UE being serviced by the first beam, wherein at least one threshold strength value defining the range of target strength values is determined based on the priority metric or a Quality of Service (QOS) Class Identifier (QCI) value of the priority UE.

9. A system to control at least one beam associated with an antenna of a cell site, the system comprising:
   at least one processor; and
   computer storage media storing computer-usable instructions that when used by the at least one processor, cause the system to perform operations comprising:
      receiving a first measurement report indicative of a first signal strength associated with a first beam that is emitted from the at least one antenna at the cell site and that is not servicing a user equipment (UE);
      based on the first signal strength being outside a range of target strength values, causing the at least one antenna to emit a second beam that (1) has a beam parameter modified as compared to the first beam and that (2) has a second signal strength; and
      subsequent to the second beam being emitted, receiving a second measurement report associated with the second beam, the second measurement report including a first indication indicating that the second beam is servicing the UE and a second indication indicating that the second signal strength associated with the second beam is within the range of target strength values or closer to the range of target strength values as compared to the first beam.

10. The system of claim 9, wherein the beam parameter comprises at least one of a phase or an amplitude, wherein the at least one of the phase or the amplitude is modified to change a beam shape to transform the first beam into the second beam.

11. The system of claim 9, the operations further comprising:
   accessing, from the first measurement report, a first position parameter indicative of a first position of the UE;
   determining the first signal strength associated with the first beam based on the first position parameter indicative of the first position of the UE;
   accessing, from the second measurement report, a second position parameter indicative of a second position of the UE; and
   determining the second signal strength associated with the second beam based on the second position parameter indicative of the second position of the UE.

12. The system of claim 9, wherein the beam parameter is modified until the second signal strength is within the range or closer to the target strength values as compared to the first beam.

13. The system of claim 9, wherein the beam parameter is modified along a pre-set step associated with the beam parameter.

14. The system of claim 9, wherein the at least one antenna is communicatively coupled to a gNodeB, and wherein the at least one antenna is structured for massive multiple-input and multiple-output (mMIMO).

15. The system of claim 9, wherein a telecommunications network comprises the cell site, and wherein the cell site is operable based on a 5G New Radio network.

16. One or more computer storage media having computer-executable instructions embodied thereon that, when executed, by one or more processors, cause a system to perform operations comprising:
  receiving a first measurement report at least partially indicative of a first signal strength associated with a first beam that is emitted from at least one antenna at a cell site, the first measurement report not encompassing a user equipment (UE);
  based on the first signal strength being outside a range of target strength values, causing the at least one antenna to emit a second beam that (1) has a beam parameter modified as compared to the first beam and that (2) has a second signal strength; and
  subsequent to the second beam being emitted, receiving a second measurement report associated with the second beam, the second measurement report encompassing the UE and at least partially indicating that the second signal strength associated with the second beam is within the range of target strength values or closer to the range of target strength values as compared to the first beam.

17. The one or more computer storage media of claim 16, wherein modifying the beam parameter comprises modifying, along a pre-set step, at least one of a phase or an amplitude to transform the first beam into the second beam having a different beam shape than the first beam.

18. The one or more computer storage media of claim 16, wherein causing the at least one antenna to emit the second beam comprises disabling the first beam to improve the second signal strength associated with the second beam.

19. The one or more computer storage media of claim 16, wherein the beam parameter comprises at least one of a phase or an amplitude, wherein the at least one of the phase or the amplitude is modified to change a beam shape to transform the first beam into the second beam.

20. The one or more computer storage media of claim 16, the operations comprising:
  accessing, from the first measurement report, a first position parameter indicative of a first position of the UE;
  determining the first signal strength associated with the first beam based on the first position parameter indicative of the first position of the UE;
  accessing, from the second measurement report, a second position parameter indicative of a second position of the UE; and
  determining the second signal strength associated with the second beam based on the second position parameter indicative of the second position of the UE.

* * * * *